(12) United States Patent
Young

(10) Patent No.: US 6,898,815 B2
(45) Date of Patent: May 31, 2005

(54) PORTABLE UNLOADING DOCK

(76) Inventor: Carl R. Young, deceased, late of Dodge City, KS (US); by Cleone Young, legal representative, 2906 Gary, Dodge City, KS (US) 67801

( * ) Notice: Subject to any disclaimer, the term of this patent is extended or adjusted under 35 U.S.C. 154(b) by 0 days.

(21) Appl. No.: 10/462,058

(22) Filed: Jun. 16, 2003

(65) Prior Publication Data
US 2004/0250360 A1   Dec. 16, 2004

(51) Int. Cl.[7] .................................................. E01D 1/00
(52) U.S. Cl. ........................................ 14/69.5; 14/72.5
(58) Field of Search ............................... 14/69.5, 71.3, 14/72.5, 71.5; 414/480; 244/137.2

(56) References Cited

U.S. PATENT DOCUMENTS

| 963,918 A | * | 7/1910 | Miller ........................ 14/69.5 |
| 3,409,923 A | * | 11/1968 | Walker ....................... 14/71.7 |
| 4,065,825 A | * | 1/1978 | Cohen ........................ 14/72.5 |
| 4,517,698 A | * | 5/1985 | Lamp'l et al. ............... 14/72.5 |
| 4,972,539 A | * | 11/1990 | Reiter ......................... 14/2.4 |
| 5,026,243 A | * | 6/1991 | Dell ........................... 414/401 |
| 5,446,937 A | * | 9/1995 | Haskins ...................... 14/69.5 |
| 5,833,260 A | * | 11/1998 | York .......................... 280/475 |
| 6,330,726 B1 | * | 12/2001 | Hone et al. .................. 14/71.5 |
| 6,368,043 B1 | * | 4/2002 | Leum et al. ................ 414/401 |
| 6,526,614 B2 | * | 3/2003 | Anderson et al. ............ 14/69.5 |

* cited by examiner

Primary Examiner—Thomas B. Will
Assistant Examiner—Raymond W Addie
(74) Attorney, Agent, or Firm—Edward L. Brown, Jr.

(57) ABSTRACT

A portable unloading dock for trucks including a frame structure, including a pair of trusses and lateral members supporting a ramp having an elevated end and a ground engaging end. The dock includes a plurality of wheels supporting the dock for manual movement, which are positioned inwardly from both ends of the ramp. A pair of linear actuators attached to the elevated end of the ramp having a contact foot for engaging the ground and lifting the elevated end of the ramp off its wheels and a plurality of adjustable length stabilizing legs mounted on the frame structure for ground engaging support when the dock is lifted off its wheels.

10 Claims, 2 Drawing Sheets

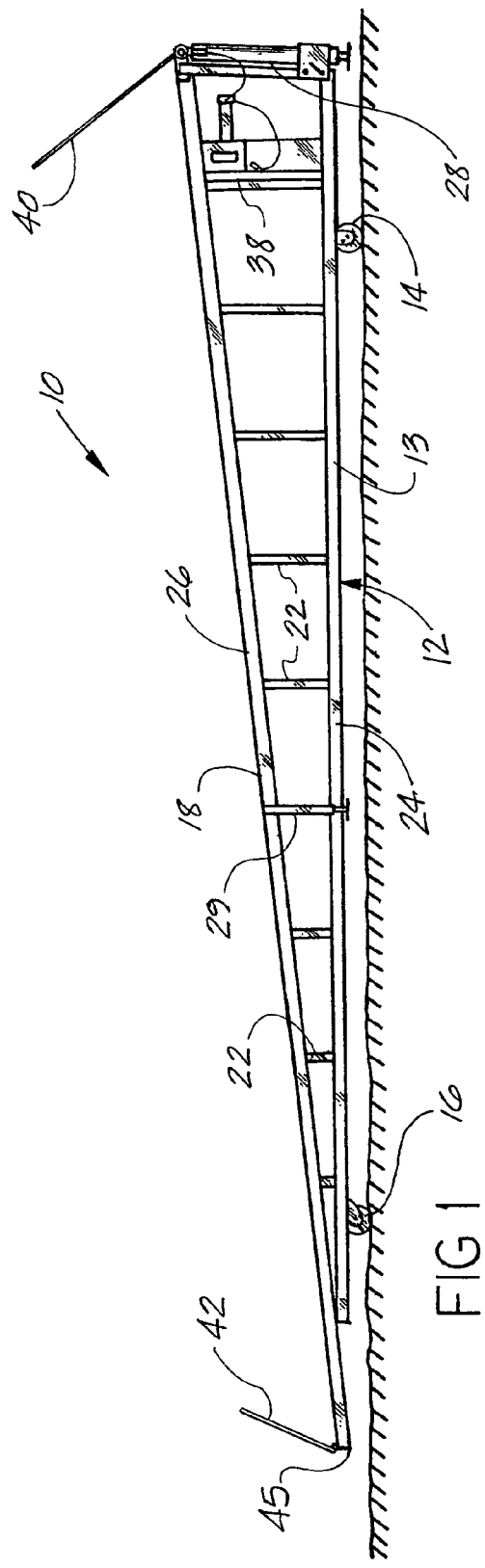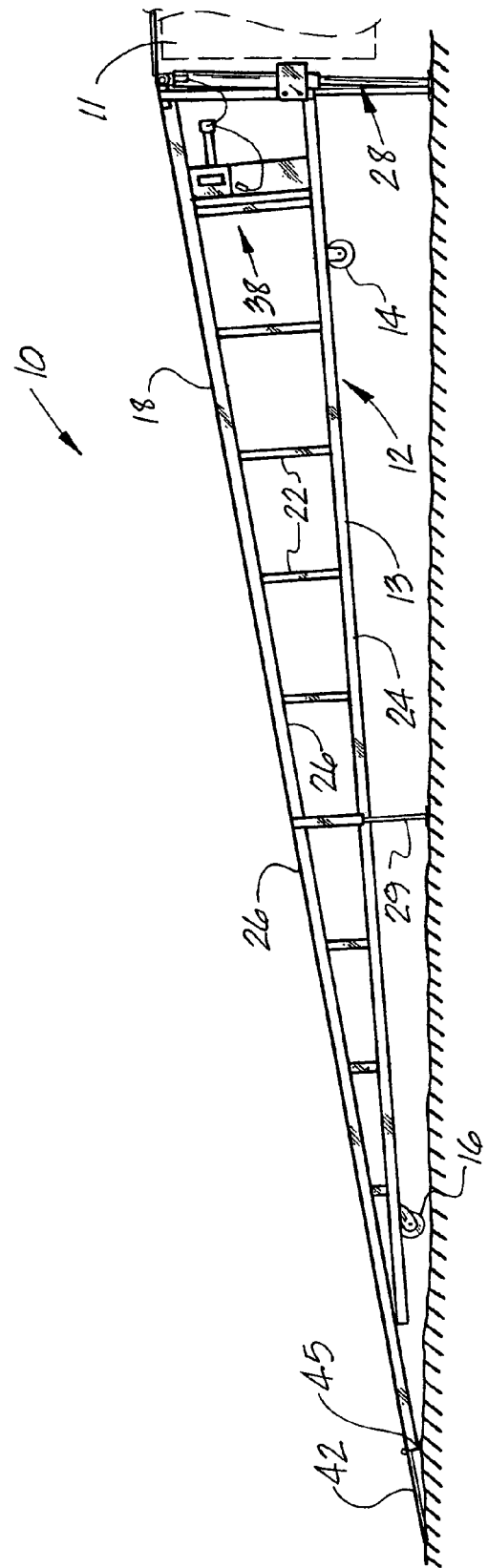

PORTABLE UNLOADING DOCK

FIELD OF THE INVENTION

The invention herein relates to truck unloading docks and more specifically to a portable unloading dock with a variable height ramp to accommodate differing height truck beds. The manually movable dock can be easily moved from a storage space up against the rear of a semi-trailer whereupon the height of the ramp can be adjusted through the use of a hydraulic power pack which elevates the end of the ramp through a pair of hydraulic cylinders for alignment with the truck bed.

BACKGROUND OF THE INVENTION

Most loading docks have a fixed height which does not always correspond with the bed height of the truck being loaded or unloaded and therefore the concept of an adjustable height ramp unit has been well known in the art for many decades, as typified in the Walker U.S. Pat. No. 3,409,923. This patent discloses a stationary ramp structure which rises out of the floor to the necessary ramp height to fit the specific truck being loaded or unloaded.

Another stationary type of adjustable height ramp structure is taught in the Clark U.S. Pat. No. 3,388,413. In this design the adjustable height ramp is located within the stationary ramp surface. A ramp includes a hinged extension portion transitioning into the truck bed, all of which moves together hydraulically for automatic adjustment to the level of the truck being unloaded.

The Bintliff U.S. Pat. No. 2,670,484, teaches a loading platform structure which is portable in that it moves laterally and provides an adjustable height elevated end while the opposite end rests on a constant level stationary dock. This platform includes a hinged extension at both ends, as in the present invention. However, it functions differently when elevated and the manner in which it is movable.

The principal object of the present invention is to provide a portable, adjustable height loading ramp which eliminates the need for a stationary dock, thereby permitting a truck to be unloaded at any location where the ramp can be moved to.

Another object of the present invention is to provide an adjustable height wheel-mounted loading ramp which when it is lifted at one end, the transport wheels are all disengaged from the ground whereupon it is supported by plurality of fixed adjustable length telescoping legs, thereby permitting it to support a forklift truck in its now stationary position.

A further object of the present invention is to provide an adjustable height loading ramp with a self-contained power pack which positions the height of the ramp for the particular truck bed being unloaded.

SUMMARY OF THE INVENTION

The present invention comprises a portable adjustable height loading ramp for loading and unloading semi-trailers without the need of a fixed elevated dock, as typically done in commerce. The dock is supported on four wheels, two of which are castered, thus permitting it to be manually moved to any semi-trailer truck location. The height adjustment means comprises a pair of hydraulic cylinders mounted on the elevated end of the ramp which lifts the ramp to the precise truck bed height. As the elevated end is lifted, the four wheels are also lifted off the ground as the ground-engaging end of the dock pivots off the ground. Once in the elevated position, a series of telescoping legs at the elevated end of the ramp and at mid-point are dropped to the ground so the ramp is now supported at both ends and in the middle, which can now support the weight of a forklift loading truck. Located at each end of the ramp is a ramp extension plate which is hinged to the ramp, thereby providing a smooth transition to the ground and onto the bed of the truck.

BRIEF DESCRIPTION OF THE DRAWINGS

FIG. 1 is a side elevational view of the unloading dock resting on its wheels with the ramp extension plates in retracted positions.

FIG. 2 is another side elevational view of the dock positioned adjacent a truck bed in its elevated position supported by its stabilizing legs and ground engaging end of the dock.

DETAILED DESCRIPTION OF THE PREFERRED EMBODIMENT

Figure 3:
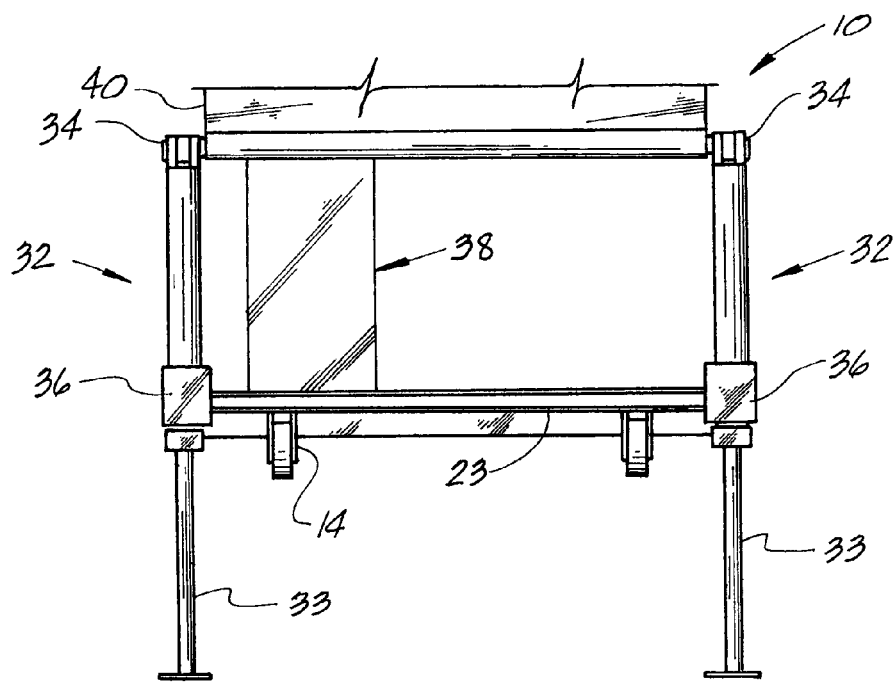
FIG. 3 is an end elevational view of the dock at the elevated end with the dock supported by hydraulic cylinders.
Figure 4:
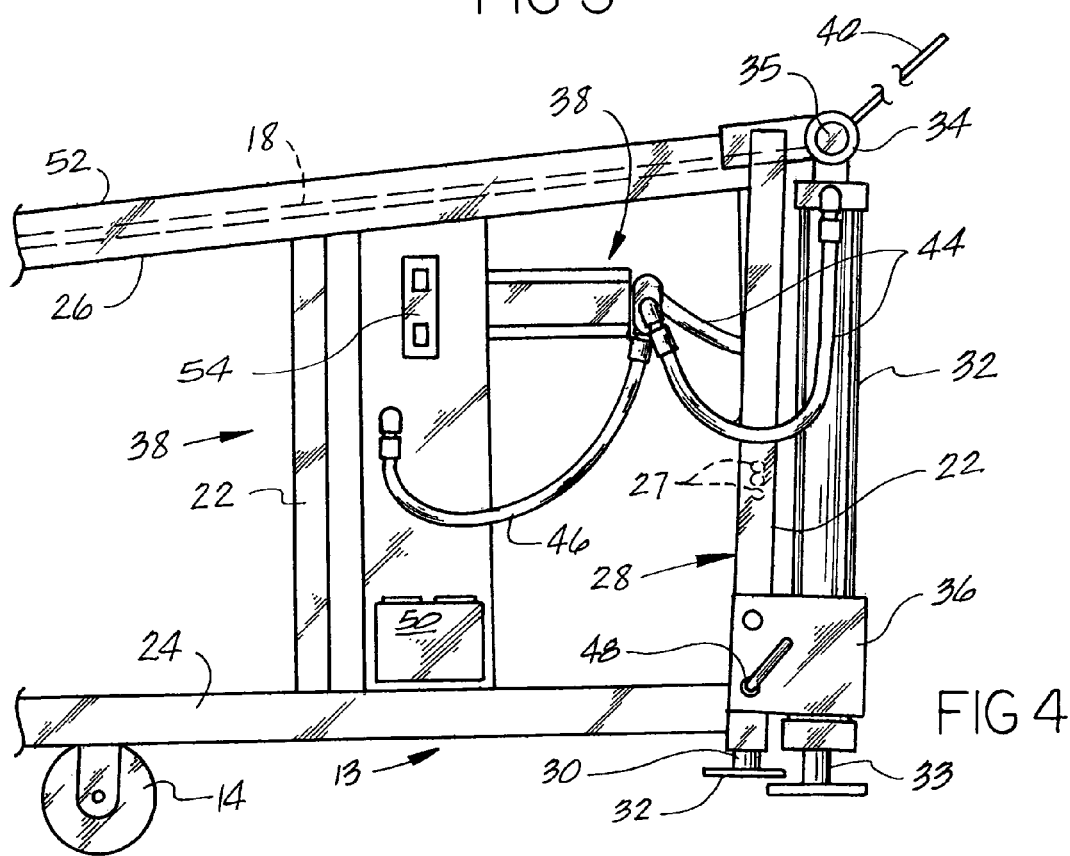
FIG. 4 is a side elevational view to an enlarged scale of the elevated end of the dock showing the hydraulic lift cylinder and stabilizing legs in their fully retracted positions.

Referring now in more detail to the drawings in which like numerals indicate like parts throughout the several views; FIG. 1 illustrates the loading dock generally by referencing numeral 10, which includes a ramp surface 18 supported on a frame structure 12. The frame structure is made up of a pair of trusses 13, one on each side, connected by lateral members 23 as seen in FIG. 3. The trusses 13 comprise of horizontal tension member 24 separated from a horizontal compression member 26 by a series of vertical members 22. Positioned on top of the frame structure 12 and welded thereto is a ramp 18 comprising a steel plate welded to the frame structure 12. The horizontal compression member 26 of the truss has an elevated edge 52 as seen in FIG. 4 which prevents any loading vehicle from falling off the side of the ramp 18.

Connected to the elevated end of the dock 10 is a hydraulic cylinder 32, which can be single or double acting having a trunnion end 34, which rotates on a pin 35 integral with truss 13. A similar hydraulic cylinder 32 is mounted on the opposite side of the dock, as seen in FIG. 3, which also has a trunnion mount 34 at its upper end, which is rotatably mounted on frame 12. The cylinder 32 includes a piston rod 33 having a footplate on the end thereof for engagement with the ground when the loading dock 10 is elevated. Rotary screws could be used in place of hydraulic cylinders. The two hydraulic cylinders 32 are kept in phase with each other by any one of well-known methods in the hydraulic art. Surrounding the lower end of hydraulic cylinder 32 is a U-shaped bracket 36 surrounding the cylinder on three sides which allows for slight horizontal movement of the rod end of the cylinder as seen in FIG. 4 which takes place as the dock 10 is elevated from its FIG. 1 position to its FIG. 2 position. Also positioned on the elevated end of dock 10 adjacent to the cylinder 32 is a telescoping leg 28 that is welded to the frame structure at its upper and lower ends. Telescoping leg 28 includes an inner section 30 slidably positioned inside leg 28. Inner section 30 is locked in place by a removable threaded pin 48 which engages a series of longitudinally spaced holes 27 in section 30 to lock the telescoping leg in position at whatever height is necessary. Both hydraulic cylinders 32 and telescoping leg 28 have footpads on the bottom thereof for engaging the ground and spreading the load. Telescoping leg 28 and hydraulic cylinder 32 as seen in FIG. 4 have essentially parallel axes which are tilted slightly inboard at their lower ends as seen in FIG. 4 to adjust for the slight shifting to the left of trunnion end 34 as the loading dock is elevated. This slight inclination is less than 10 degrees from the vertical, which helps minimize the side loading on cylinder 32 in its fully extended position.

The power source for lifting hydraulic cylinders is a self-contained hydraulic power pack 38 that is well known in the art and not described in detail. They include a motor powering a hydraulic pump and a control valve for supplying hydraulic pressurized fluid to the cylinders through hydraulic lines 44 from a reservoir line 46. The power pack 38 can be powered by a battery 50 or supplied with current from a connecting cable not shown.

A second set of telescoping legs 29 are positioned midway on the loading dock 10 as seen in FIGS. 1 and 2 and they are essentially identical in function and structure to telescoping leg 28 as previously described.

A pair of wheels 14 are positioned inboard from the elevated end of dock 10 as seen in FIGS. 2 and 3, while a pair of castered wheels 16 are positioned inboard from the ground engaging end 45 of the dock. All four of the wheels 14 and 16 could be castered. The loading dock 10 has a substantial length of approximately 25 feet whereby the slope of the ramp 18 in its elevated condition as shown in FIG. 2 is approximately 15 degrees which is a relatively safe for a forklift truck to negotiate. The width of the ramp 18 is 4½ ft. wide.

OPERATION

Loading dock 10 can be moved manually when it's positioned on its wheels as shown in FIG. 1 and can be stored in the appropriate place. Small businesses that don't have a fixed loading dock can utilize the present invention and maneuver the dock 10 up to a truck for loading or unloading on a smooth-paved surface. Once the dock 10 is positioned behind a truck 11, the power pack supplies pressurized hydraulic fluid to cylinders 32 in a parallel flow path elevating both the cylinders 32 together which elevate the loading dock to a flush position with the floor bed of the truck 11 as seen in FIG. 2. Once in this position, the telescoping stabilizing legs 28 and 29 are extended through the removal of pin 48 until their respective footpads contact the ground in this elevated position. The lifting of the elevated end of loading dock 10 causes the ground engaging left end of the dock 45 to engage the ground so that both wheels 14 and 16 are lifted off the ground. Stabilizing legs 28 and 29 are then extended to engage the ground and pinned in place. The hydraulic power pack 38 slightly retracts the cylinders 32 thereby transferring the full load for the dock 10 to the four stabilizing legs 28 and 29 and the ground engaging end 45 of the dock. The dock is now fully engaged with the ground at five separate stations on the dock.

After use of the dock 10 is completed, hydraulic cylinders 32 are again extended lifting stabilizing legs 28 and 29 off the ground. Pins 48 on the stabilizing legs 28 and 29 are removed and the inner section 30 of the legs are fully retracted to their FIG. 1 position. The hydraulic cylinders 32 are then slowly retracted until the dock comes to rest on its wheels 14 and 16. The dock 10 is then moved to the next truck or its storage position.

It will be understood that the foregoing relates only to a preferred embodiment of the present invention and the numerous changes and modifications may be made therein without departing from the spirit and scope of the invention as set forth in the following claims.

I claim:

1. A portable unloading dock for trucks comprising:
a frame structure including a pair of trusses connected by lateral members;
a ramp supported on the frame structure having an elevated end and a ground engaging end;
a plurality of wheels supporting the fame structure on the ground during movement of the ramp, the wheels are positioned inwardly from the ends of the ramp;
at least one linear actuator attached to the elevated end of the ramp having a contact foot for engaging the ground and lifting the elevated end of the ramp off its wheels;
a plurality of adjustable length telescoping, stabilizing legs mounted along the length of the frame for ground engaging support when the dock is lifted off its wheels.

2. A portable unloading ramp, as forth in claim 1, further comprising a bracket partially surrounding the lower end of the actuator permitting limited horizontal movement of the actuator, the opposite end of the actuator being pivotally mounted to the frame structure of the bracket thereby permitting minimal rotation of the actuator relative to the fame during lifting of the elevated end of the ramp.

3. A portable unloading ramp, as set forth in claim 1, wherein the stabilizing lees are mounted to the frame at an angle less than 10 degrees from the vertical when the ramp and frame structure are wheel supported.

4. A portable unloading ramp, as set forth in claim 1, wherein the telescoping legs include two sections; a stationary section fixed to the frame structure and a telescoping section slidable within the stationary section and a removable locking pin traversing the two sections for locking the sections from movement relative to each other.

5. A portable unloading ramp, as set forth in claim 1, wherein the ramp further comprising two short extensions pivotally mounted, one to each end of the ramp for transition from the ramp to the ground and to the floor of the truck bed.

6. A portable unloading ramp, as set forth in claim 1, including a self-contained electrically powered hydraulic power pack and the linear actuator is a pair of hydraulic cylinders connected to said power pack for operation thereof.

7. A portable unloading dock for trucks comprising:
a frame structure having sides;
a ramp supported on the frame structure having an elevated end and a ground engaging end;
a plurality of wheels supporting the frame structure on the ground during movement of the ramp, the wheels are positioned inwardly from the ends of the ramp;
at least one linear actuator pivotally attached to the elevated end of the ramp having a contact foot at its lower end for engaging the ground and lifting the elevated end of the ramp off all of its wheels;
a plurality of adjustable length telescoping, stabilizing legs rigidly mounted along the length of the frame for ground engaging support when the dock is lifted off its wheels.

8. A portable unloading ramp, as set forth in claim 7, wherein the stabilizing legs comprise a pair of legs at the elevated end of the ramp on opposite sides of the frame and a second pair of legs on opposite sides of the flame at approximate the mid area of the frame structure.

9. A portable unloading ramp as set forth in claim 7, further including a bracket partially surrounding the lower end of the actuator permitting limited horizontal movement the upper end of the actuator being pivotally mounted to the frame structure thereby permitting minimal rotation of the actuator about its pivotal mount.

10. A portable unloading ramp as set forth in claim 7 wherein the stabilizing legs are mounted to the frame at an angle less than 10 degrees from the vertical when the ramp and frame structure are wheel supported.

* * * * *